(12) United States Patent
Lillelund et al.

(10) Patent No.: US 6,279,788 B1
(45) Date of Patent: Aug. 28, 2001

(54) STORAGE CONTAINER WITH POURING INSERT (75) Inventors: Stig Lillelund, Gentofte; Jakob Heiberg, Charlottenlund; Hanne Dalsgaard Jeppesen, Holte, all of (DK); Robert H. C. M. Daenen, Essene (BE)

(73) Assignee: Dart Industries Inc., Orlando, FL (US)

( * ) Notice: Subject to any disclaimer, the term of this patent is extended or adjusted under 35 U.S.C. 154(b) by 0 days.

(21) Appl. No.: 09/131,260

(22) Filed: Aug. 7, 1998

(51) Int. Cl.⁷ ..................................................... B67D 3/00
(52) U.S. Cl. .................................................. 222/481
(58) Field of Search .................................. 222/478, 481, 222/482, 484, 485, 483; 220/662, 665, 256, 784, 788, 793, 212

(56) References Cited

U.S. PATENT DOCUMENTS

| D. 276,400 | 11/1984 | Daenen et al. . | |
|---|---|---|---|
| D. 276,402 | 11/1984 | Daenen et al. . | |
| D. 279,251 | 6/1985 | Daenen et al. . | |
| D. 280,281 | 8/1985 | Conti et al. . | |
| D. 287,325 | 12/1986 | Schmidt . | |
| D. 312,968 | 12/1990 | Wolff . | |
| D. 350,255 | 9/1994 | Daenen et al. . | |
| D. 371,053 | 6/1996 | Lillelund et al. | D7/612 |
| D. 372,401 | 8/1996 | Lillelund et al. | D7/612 |
| D. 376,734 | 12/1996 | Petrie | D7/629 |
| D. 382,763 | 8/1997 | Jeppesen et al. | D7/316 |
| D. 399,099 | 10/1998 | Cousins | D7/615 |
| 3,089,608 | 5/1963 | Burdick et al. . | |
| 3,421,654 | 1/1969 | Hexel . | |
| 3,982,658 | 9/1976 | Bozek et al. . | |
| 3,995,766 | 12/1976 | Fralick . | |
| 4,488,667 | 12/1984 | Swett et al. . | |
| 4,723,693 | * 2/1988 | DeCoster | 222/483 |
| 4,898,292 | 2/1990 | VerWeyst et al. . | |
| 4,923,085 | 5/1990 | Lillelund et al. . | |
| 5,002,197 | 3/1991 | Ponsi . | |
| 5,161,711 | 11/1992 | Picozza et al. . | |
| 5,181,626 | 1/1993 | Daenen et al. . | |
| 5,251,774 | * 10/1993 | Engle | 220/212 |
| 5,421,472 | * 6/1995 | Beckertgis | 222/481 |
| 5,549,214 | 8/1996 | Harris | 220/339 |
| 5,579,932 | 12/1996 | Drozd et al. | 215/207 |

* cited by examiner

Primary Examiner—Philippe Derakshani
Assistant Examiner—Thach H Bui
(74) Attorney, Agent, or Firm—Taylor J. Ross (57) ABSTRACT A container for storing items, such as foodstuffs. The container includes a sidewall which includes a monolithic window portion having greater transparency than the remainder of the sidewall. This is achieved by forming the container of a clear, tinted material, and forming the window portion with a reduced thickness, and/or forming the window portion with a smooth surface and forming the remainder of the sidewall with an obscuring texture. A cover may be used to close the container, and may form a seal with the container. The cover may include pivot pins to permit the cover to be pivoted to a position breaking the seal, thus permitting easier removal of the cover. A pouring insert may also be used with the container. The pouring insert is mounted to the mouth of the container, and includes a main pour spout and a secondary pour spout. Both pour spouts include pour guides to direct spilled contents back into the container. A hinge in the pouring insert permits a first section to remain in position while a second section is folded therebeneath. The second section may be secured in this position, forming a scooping aperture.

5 Claims, 4 Drawing Sheets

STORAGE CONTAINER WITH POURING INSERT

CROSS-REFERENCE TO RELATED APPLICATIONS

This application is related to Ser. Nos. 29/091,887, filed Aug. 7, 1998, 29/091,889, filed Aug. 7, 1998, now U.S. Pat. No. DES. 414,650, Ser. No. 29/09,886, filed Aug. 7, 1998, now U.S. Pat. No. DES. 414,652, which are incorporated by reference herein and made a part hereof, including but not limited to those portions which specifically appear hereinafter.

STATEMENT REGARDING FEDERALLY SPONSORED RESEARCH

Not Applicable

BACKGROUND OF THE INVENTION

The present invention relates in general to household storage containers, particularly those used for foodstuffs. In particular, the present invention relates to an improved storage container having an integral window, and which may be used with a cover providing a seal which may be opened by pivoting of the cover, and further which may be used with a pouring insert which forms pouring and scooping openings with the container.

Numerous types of household storage containers are known, including those which are typically formed of plastic, which have a container with a sealing cover, and which are typically used for food storage. A first problem with known containers of this type is the desire to provide a good seal between the container and cover, yet permit the cover to be easily applied and removed. Typically, the better the seal, the more difficult it is to apply and remove the cover. As such, there is a continuing need for a cover which provides a good seal, yet is easy to use.

A further problem with such containers is the desire to permit visual inspection of the contents, yet provide an aesthetic appearance by visually obscuring the contents. It has been known to provide containers which have an opaque main body with a clear window section. While these containers provide great advantages over fully clear or fully opaque containers, they have a strong disadvantage in cost. Specifically, the opaque main body and clear window section are molded in two separate steps, increasing molding time, complexity, and cost.

Finally, such containers have disadvantages in dispensing the contents. Containers which are large provide adequate storage, and the contents may be dispensed by scooping from the container, but it is difficult to pour contents from the container. Smaller containers are easier to use by pouring the contents, but do not provide sufficient storage.

SUMMARY OF THE INVENTION

An object of the present invention is to provide a storage container which substantially obscures the contents except for a window section for visual inspection.

Another object of the present invention is to provide such a container in which the window section is a monolithic portion of the container, by providing the window section with a reduced thickness and/or an appreciably more transparent surface finish.

A further object of the present invention is to provide a container and cover combination permitting sealing of the container, yet easy application and removal of the cover.

Another object of the present invention is to provide such a combination in which a sealing bead provides a seal, yet the cover may be pivoted by application of force to break the seal.

Yet another object of the present invention is to provide a container and a pouring insert mounted to the container, with the pouring insert aiding in the dispensing of contents from the container.

A further object of the present invention is to provide such a container and pouring insert in which the insert may have a secondary panel folded to a hidden position to provide a large opening for scooping of contents from the container.

These and other objects are achieved by a container for storing items, such as foodstuffs. The container includes a sidewall which includes a monolithic window portion having greater transparency than the remainder of the sidewall. This is achieved by forming the container of a clear, tinted material, and forming the window portion with a reduced thickness, and/or forming the window portion with a smooth surface and forming the remainder of the sidewall with an obscuring texture. A cover may be used to close the container, and may form a seal with the container. The cover may include pivot pins to permit the cover to be pivoted to a position breaking the seal, thus permitting easier removal of the cover. A pouring insert may also be used with the container. The pouring insert is mounted to the mouth of the container, and includes a main pour spout and a secondary pour spout. Both pour spouts include pour guides to direct spilled contents back into the container. A hinge in the pouring insert permits a first section to remain in position while a second section is folded therebeneath. The second section may be secured in this position, forming a scooping aperture.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
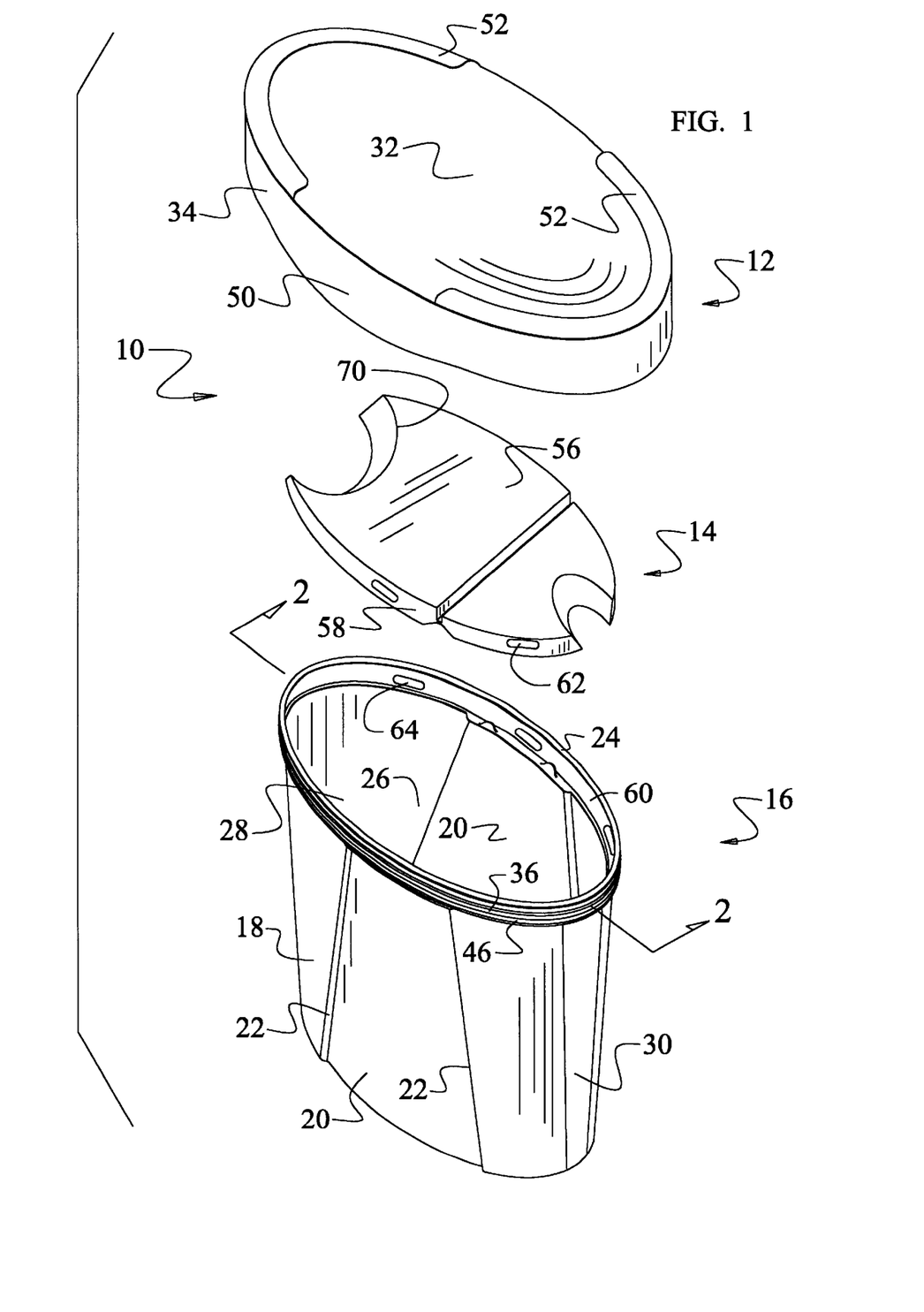
FIG. 1 is an exploded perspective view of a container, cover and pouring insert according to a preferred embodiment of the invention.

With reference to FIG. 1, a container according to the present invention is generally designated by reference numeral 10. The container 10 may be employed by itself, but is typically used with a cover, generally designated by reference numeral 12. Further, a pouring insert, generally designated by reference numeral 14, may be used with the container 10, with or without the cover 12.

Figure 2:
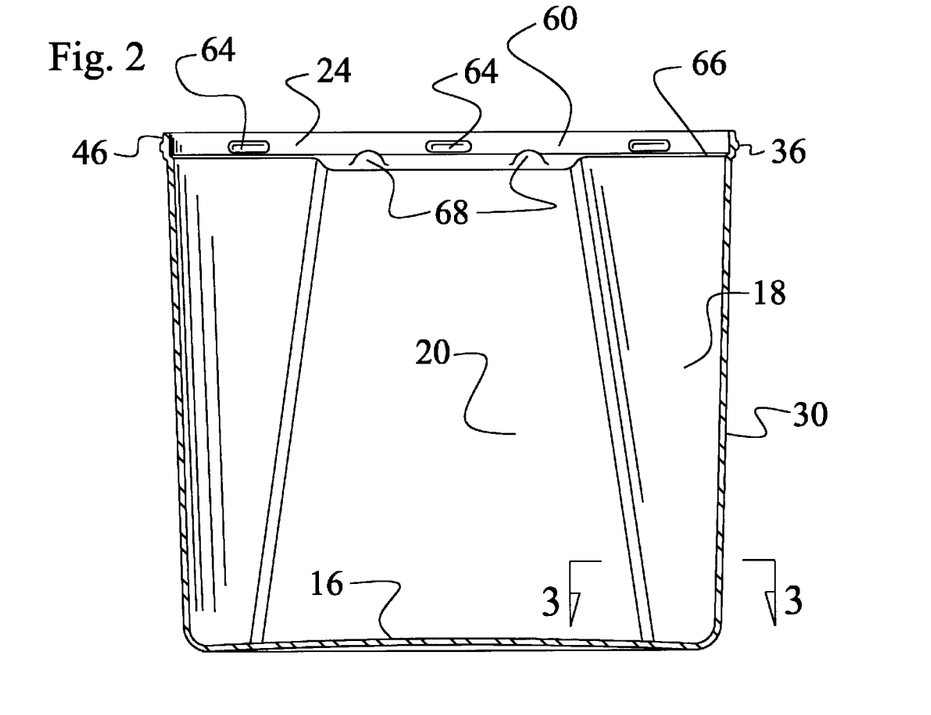
FIG. 2 is a cross-sectional side view of the container of FIG. 1 along line 2—2.

The container 10 includes a bottom wall 16 (FIG. 2) defining a stable surface for supporting the container 10. While the bottom wall 16 may be planar, for increased strength or other reasons made clear below, it may take a more complex shape. In the embodiment shown, it takes the form of a shallow downward concave. One or more sidewalls 18 extend upward from the periphery of the bottom wall 16. In the preferred embodiment shown, the periphery of the bottom wall 16 is oval, with a single continuous sidewall 18. Other peripheral shapes may be employed, however, such as circular, rectangular, square, etc. The sidewall 18 is secured to the bottom wall 16, preferably by forming both as a single monolithic unit, such as by injection molding. The bottom wall 16 and sidewall 18 may be formed of various materials, but are preferably formed of plastic.

Depending upon the size of the container 10, it may be desirable to form one or more pairs of sidewall depressions 20 in the sidewall 18. In the embodiment shown, a single pair of sidewall depressions 20 are located at positions centered upon the short axis of the oval form of the sidewall 18. The sidewall depressions 20 should be spaced from each other by a distance less than the distance between the average user's fingertip and thumb, such that the edges of the sidewall depressions 20 form a pair of spaced ridges 22 which may be grasped by the user with a single hand to assist in lifting the container 10.

The sidewall 18 extends upward from the bottom wall 16, and ends at an upper rim 24. The bottom wall 16 and sidewall 18 below this upper rim 24 define an interior 26 which may be accessed through a mouth 28 defined by the upper rim 24. The interior 26 receives a quantity of material or items to be stored. While not limited to such, the container 10 is particularly suited to storing food items, and in particular granular food items such as flour, rice, cereal, coffee, etc. It is often desirable for the user to be able to determine the level of the contents of container 10, and preferably also the nature of the contents. While the user could view the contents through the mouth 28, this may be inconvenient if the container 10 is closed by the cover 12 as described below, or is located on a high shelf.

While the container 10 could be formed of an opaque material, to permit this inspection it is preferred that at least a portion of the container 10 be at least partially transparent or translucent. To this end the entire container 10 may be formed as completely transparent, with no tinting. For aesthetic reasons, however, this is not always preferred by users. It is therefore preferred that the container 10 include one or more window portions 30 which are at least partially transparent or translucent, while the remainder of the container 10 is opaque or will at least substantially obscure the contents in ambient light conditions (i.e., no or minimal backlighting).

The window portions 30 may be formed as a separate material, using a two-step molding process, as is known in the art. This provides good results, but is expensive. As such, it is preferred to form the window portions 30 as a monolithic portion of the container 10, but with appreciably increased transparency. This may be achieved by providing the window portions 30 with a reduced thickness, by forming the window portions 30 as smooth while forming the remainder of the sidewall 18 with a texture, or both.

Figure 3:
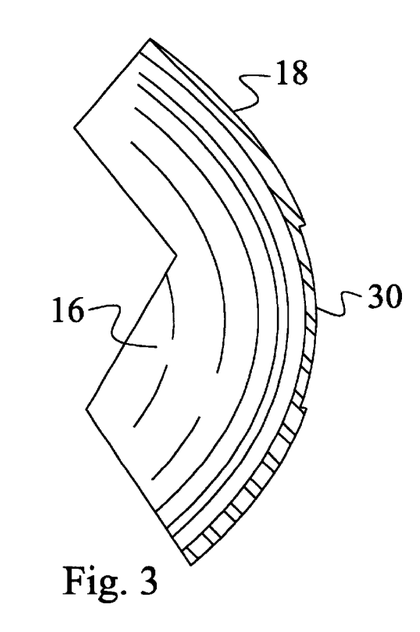
FIG. 3 is a cross-sectional detail view along line 3—3 of FIG. 1.

With regard to a reduced thickness, the window portion 30 is formed as a monolithic portion of the sidewall 18, with both formed both from a clear, but uniformly tinted, material, such as plastic. The window portions 30 are, however, formed with a reduced thickness, as best shown in FIG. 3. As may be envisioned, the thicker the material, the greater the effect of the tinting in obscuring visibility. By reducing the thickness in the window portions 30, the window portions 30 are provided with increased visibility with respect to the remainder of the sidewall 18.

The amount of tinting and amount of thickness reduction in the window portions 30 necessary to achieve the desired effect will of course vary with the material, the tint, and the color of the tint. The thickness of the window portions 30 may be a limiting factor, upon which others are based. Specifically, the window portions 30 must of course be sufficiently thick to maintain structural integrity of the container 10. Additionally, if formed by injection molding of plastic, the reduced thickness between the walls of the mold cavity will impede flow of the injected plastic, possibly resulting in undesirable visible imperfections within the window portions 30. As such, the thickness of the window portions 30 has a lower limit depending upon the strength characteristics of the material forming the container 10 and the method of its manufacture. From this, it may be determined the amount of tint (for a particular color) which provides relatively clear visibility through the window portions 30 while at the same time providing relatively obstructed visibility through the remainder of the sidewall 18. In practice, it has been found that forming the window portions 30 with a thickness of between approximately 50–90% of the thickness of the remainder of the sidewall 18 produces good results for polypropylene.

The other alternative for forming window portions 30 is the difference in surface smoothness. Specifically, the window portions 30 are formed as a smooth, glossy surface, while the remainder of the sidewall 18 is formed with an obscuring surface texture. This obscuring surface texture may take many forms, such as ribbing, patterns, etc. While the texture may be formed on both the interior and exterior surfaces, it is preferred that only the exterior include the texture, while the interior remains smooth for ease of cleaning. As examples, good results have been achieved using a SPI-C1 surface for the window portions 30, while using a SPI-A2 surface for the remainder of the sidewall 18.

While either method may provide acceptable results, it is preferred to employ both to provide the maximum clarity in the window portions 30 and maximum opacity in the remainder of the sidewall 18. As such, it is preferred to employ a clear tinted material, form the window portions 30 with a reduced thickness and glossy surface, and to form the remainder of the sidewall 18 with an obscuring texture.

Figure 4:
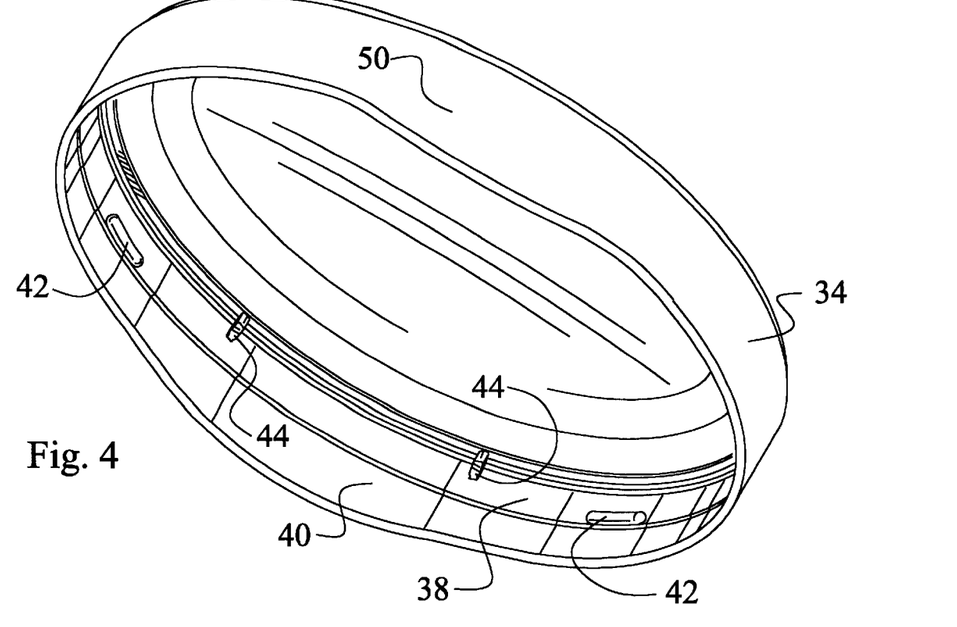
FIG. 4 is a bottom perspective view of the cover.

The container 10 described above may be used alone, but it is much preferred to use it in conjunction with the cover 12. As is well known, the cover 12 is sized to overlie and close the mouth 28 to prevent ingress of contaminant and egress of contents. As best shown in FIGS. 1 and 4, the cover 12 preferably includes a top wall 32 having a periphery confirming to that of the mouth 28, and a skirt 34 extending downward from the periphery of the top wall 32 so as to surround the upper rim 24 and a portion of the sidewall 18 when cover 12 is mounted to the container 10.

The fit between the skirt 34 and upper rim 24 will of course determine the degree to which the cover 12 seals the container 10. While not required, it is preferred that the fit provide a seal against not only gross ingress and egress, but also against the passage of moisture, and most preferably against the passage of air. To achieve such a seal, a sealing bead 36 may be provided on one of the container 10 or cover 12.

Figure 6:
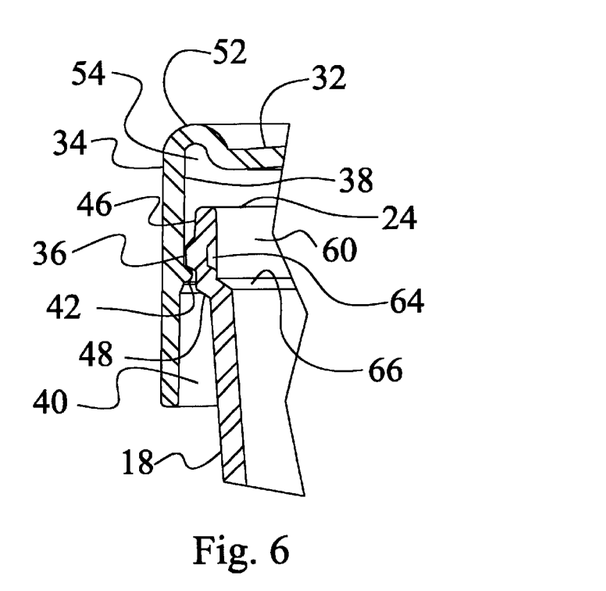
FIG. 6 is a detail cross-sectional view along line 6—6 of FIG. 5.

If provided on the cover 12 (this arrangement not being shown), the sealing bead 36 would project inward from an interior face 38 of the skirt 34 to provide a close sliding fit against the sidewall 18. If the container 10 includes the sidewall depressions 20, the skirt 34 may have a conforming periphery, or the sidewall depressions 20 may end below the upper rim 24 as shown. If provided on the container 10, the sealing bead 36 will project outward from the sidewall 18 at a position in proximity to the upper rim 24, and in a position to seat against the interior face 38 of the skirt 34 with a close sliding fit, as best shown in FIG. 6. This will be referred to as the mounted position of the cover 12. To ease manual application of the cover 12 into this mounted position, the interior face 38 of the skirt 34 may have a reduced thickness area 40 extending from the free edge of the skirt 34 to a position below the sealing bead 36 when in the mounted position.

This arrangement provides the desired sealing characteristics, and permits easy application and removal of the cover 12. It may be desired, however, to prevent unintentional removal of the cover 12, such as if the container 10 were accidentally dropped. To this end, the one of the container 10 or cover 12 which does not include the sealing bead 36 may include one or more locking beads 42. In the preferred embodiment shown, the cover 12 includes the locking beads 42. The locking bead 42 may be formed as a single continuous protrusion extending about the entire periphery of the interior face 38. It is preferred, however, to form several discrete locking beads 42 at peripherally spaced locations. These peripheral locations may be chosen to provide the desired protection depending upon the particular peripheral shape of the container 10. For the oval periphery shown, a single locking bead 42 is placed generally at each mid-point between the major and minor axes.

In the embodiment shown, with the sealing bead 36 formed on the sidewall 18, the locking beads 42 extend inward from the interior face 38 of skirt 34. If the sealing bead 36 were formed on the skirt 34 (this arrangement not being shown), the locking beads 42 would extend outward from the sidewall 18. For either arrangement, the locking beads 42 are located to be positioned immediately below the sealing bead 36 when the cover 12 is in the mounted position, as best shown in FIG. 6. The locking beads 42 must pass over the sealing bead 36 as the cover 12 is mounted. As such, when the locking beads 42 are employed it is preferred that at least one of the container 10 or cover 12 be formed of a material (such as plastic) having sufficient flexibility to permit this. The locking beads 42 must also pass over the sealing bead 36 to permit removal of the cover 12, and it is this requirement which serves to prevent unintentional removal of the cover 12. The amount to which the sealing bead 36 and locking beads 42 extend outward and/or inward, together with the flexibility of the sidewall 18 and skirt 34 will determine the amount of force required to apply and remove the cover 12.

Figure 5:
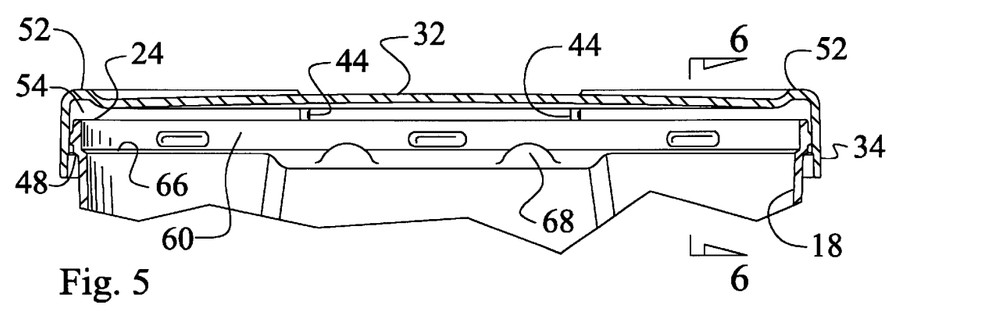
FIG. 5 is a detail cross-sectional side view, similar to FIG. 2, of the container and cover, with the cover in the sealed position.
Figure 7:
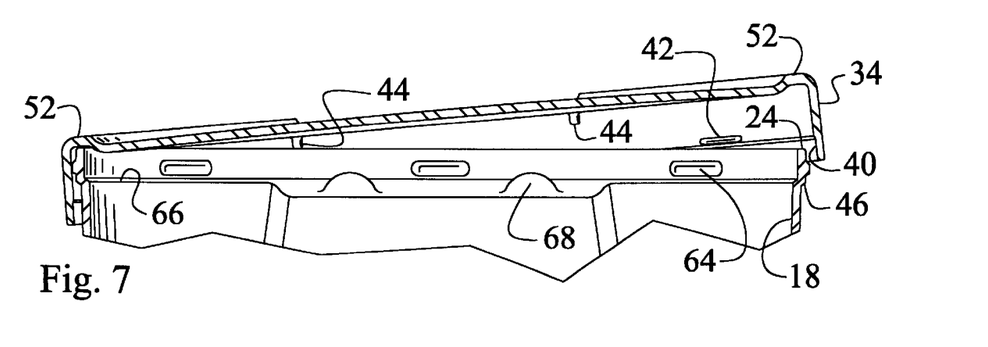
FIG. 7 is a detail cross-sectional side view of the container and cover with the cover in the released position.

Depending upon the fit of the seal provided by the sealing bead 36 (if used), and the resistance to removal provide by the locking beads 42 (if used), it may be desirable to provide an arrangement to aid manual removal of the cover 12. As best illustrated in FIGS. 4, 5 and 7, the skirt top wall 32 may include at least one pair of pivot pins 44 (only one pin in each pair being shown) extending downward to rest upon the upper rim 24, and space the top wall 32 from the upper rim 24, when the cover 12 is in the mounted position. The pivot pins 44 are positioned at spaced locations along the periphery of the top wall 32, with the peripheral length between associated pairs of the pivot pins 44 defining a point for application of force to release the seal between the container 10 and cover 12. In the preferred embodiment shown, two pairs of pivot pins 44 are provided, with each pair being located at positions spaced from, and substantially parallel to, the minor axis of the oval periphery.

The pivot pins 44 are employed as fulcrums for pivoting the cover 12 to a position at which the cover 12 may be easily removed. As illustrated by comparison of FIGS. 5 and 7, application of downward force between the pair of pivot pins 44 (in this case at the end of the major axis) will cause the portion of the cover 12 to which force is applied to pivot downward, and cause the other end of the cover 12 to pivot upward. The placement of the pivot pins 44 will be such that this upward pivoting is sufficient to raise the interior face 38 above the level of the sealing bead 36 (or at least to raise the reduced thickness area 40 to the level of the sealing bead 36). At this point the close fit forming the seal is broken, and the cover 12 may be easily removed. It will be understood that the optimum placement of the pivot pins 44 will vary depending upon the peripheral shape of the container 10. Further, it will be apparent that the two pairs of pivot pins 44 in the embodiment shown could be replaced by a single pair of projections (not shown), with each projection having a length extending between the two (unassociated) pivot pins 44 shown in FIG. 5, with each end of such a projection defining one of the pivot pins 44.

During this pivoting, the portion of the skirt 34 between the operative pivot pins 44 will tend to rotate toward the sidewall 18, as best illustrated in FIG. 7. As such, the skirt 34 could act as an obstruction to the desired pivoting. To avoid this, the sidewall 18 may be formed with an inward taper toward the bottom wall 16, as shown. Alternatively or additionally, the sidewall 18 may include a rim section 46 located adjacent the upper rim 24, with the rim section 46 being spaced peripherally outward from the sidewall 18 by a transition section 48. This will serve to space the skirt 34 from the sidewall 18 a greater distance, permitting a greater amount of pivoting.

Depending upon the flexibility of the cover 12 and the fit of the seal formed (especially when locking beads 42 are employed), there may be a tendency for the cover 12 to simply bend upon application of this pivoting force, rather than pivot as desired. To prevent this, it may be desirable to reinforce the cover 12. In the embodiment shown, the skirt 34 includes a strengthening area 50 between the location to which force is applied and the location which will pivot upward, with this strengthening area 50 having a greater length than the remainder of the skirt 34. Additionally or alternatively, a reinforcing rib 52 may be formed in the top wall 32 along the periphery between the operative pair of pivot pins 44. While this reinforcing rib 52 could be solid, it is preferred that it be of a substantially similar thickness to the remainder of the top wall 32, such that is forms a downward opening concave area 54. As shown, the upper rim 24 may enter this concave area 54 during pivoting of the cover 12 to thus permit even greater pivoting. Beyond this, the reinforcing rib 52 provides a visual indicator to the user of the location to which the force should be applied. Finally, the reinforcing rib 52 may serve to provide stable stacking of two or more containers 10. Specifically, if the container 10 is tapered inward toward the bottom wall 16, the periphery of the bottom wall 16 may fit between the reinforcing ribs 52 on the cover 12, serving to secure another container 10 upon the cover 12. In this regard, the top wall 32 may have a curvature similar to that of bottom wall 16 for mating to further enhance stability. As such, it may be seen that the reinforcing rib 52 may serve four different functions.

The container 10 and cover 12 described above may be used together to conveniently store items. To dispense the contents from the container 10, the cover 12 is removed, and a portion of the contents may be removed by hand, by scoop, or the entire container may be tilted to pour contents from the container 10. While this is acceptable, it is preferred to permit more convenient dispensing.

To this end, the container 10 may be employed with the pouring insert 14, best shown in FIGS. 1 and 8–11. The pouring insert 14 includes a main panel 56 having an outer periphery, and a mounting skirt 58 extending downward from the outer periphery. This outer periphery is sized and shaped to correspond to, and be closely received within, the mouth 28 of container 10. The location of the pouring insert 14 within mouth 28 as shown in FIGS. 8–12 will be referred to as the operative position of the pouring insert 14. When in this operative position, the upper surface of the main panel 56 may be slightly below, at the same height as, or slightly above, the upper rim 24. It is preferred that this upper surface be substantially at the same height as the upper rim 24.

In the operative position, the outer face of the mounting skirt 58 will abut against the interior face of the sidewall 18 adjacent the upper rim 24, with this area of the sidewall 18 being referred to as a mounting rim 60. The fit between the periphery of the main panel 56, the mounting skirt 58, and the mounting rim 60 may be sufficiently tight that the pouring insert 14 is retained in place. However, any fit sufficiently tight to retain the pouring insert 14 against the force of the contents resting upon it during pouring would likely cause the pouring insert 14 to be difficult to manually mount. As such, it is preferred that this fit be close, but to provide an additional arrangement to secure the pouring insert 14 in the operative position.

For example, it is preferred that the mounting skirt 58 and mounting rim 60 include a mating rib and groove arrangement. Specifically, one of the mounting skirt 58 and mounting rim 60 will include one or more mounting ribs 62, and the other of the mounting skirt 58 and mounting rim 60 will include one or more mounting grooves 64. In the embodiment shown, the mounting ribs 62 are located on the mounting skirt 58, while the mounting grooves 64 are located on the mounting rim 60. The mounting ribs 62 may comprise one or more continuous peripheral ribs (not shown), or discrete peripherally spaced ribs, as shown, with the mounting grooves 64 being similarly designed for mating. As may be envisioned, a slight flexing of the sidewall 18 and/or mounting skirt 58 will permit the pouring insert 14 to be placed in the operative position, or removed therefrom.

While the mounting ribs 62 and mounting grooves 64 will serve to retain the pouring insert 14, during manual mounting it may be difficult to avoid pushing the pouring insert 14 past the operative position and into the interior 26. To prevent this, the transition section 48 described above may be advantageously used. Specifically, the transition section 48 forms an upward facing mounting shoulder 66 on the interior face of the sidewall 18. By proper placement of the transition section 48, this mounting shoulder 66 will be located at the bottom of the mounting rim 60, such that the lower free edge of the mounting skirt 58 will abut the mounting shoulder 66, thus limiting downward movement of the pouring insert 14 once the pouring insert 14 reaches the operative position.

Figures 8, 9, 10, 11:
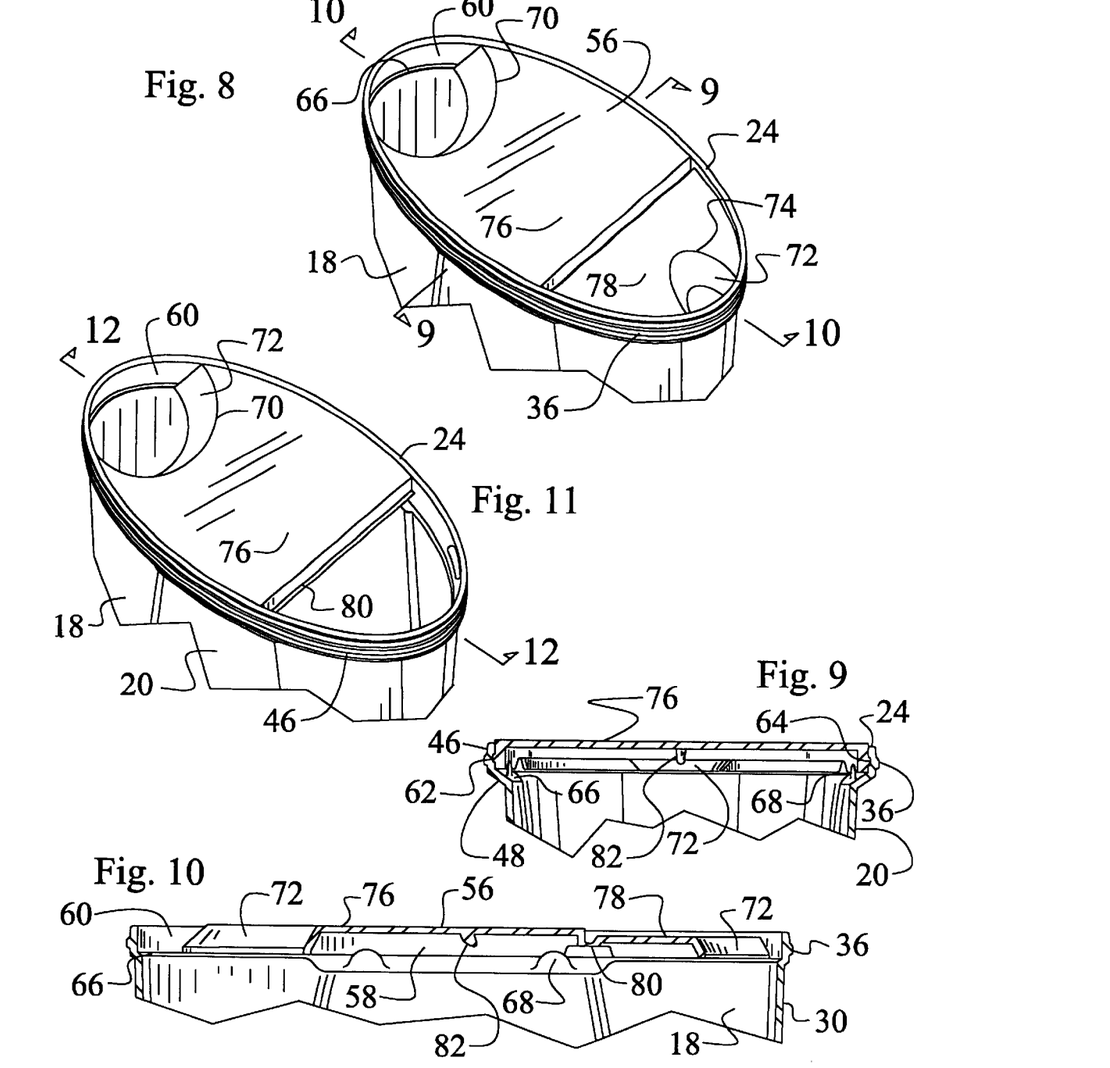
FIG. 8 is a perspective view of the container with the pouring insert mounted in an extended position.
FIG. 9 is a detail cross-sectional end view along line 9—9 of FIG. 8.
FIG. 10 is a detail cross-sectional side view along line 10—10 of FIG. 8.
FIG. 11 is a perspective view of the container with the pouring insert mounted in a folded position.

To further ensure that the pouring insert 14 is properly seated, a plurality of blocking fingers 68 may extend upward from the mounting shoulder 66, as best illustrated in FIGS. 9 and 10. The blocking fingers 68 are spaced peripherally inward from the mounting rim 60 by a distance at least equal to, and preferably slightly greater than, the thickness of the mounting skirt 58. As such, the lower edge of the mounting skirt 58 will abut against the blocking fingers 68 if the pouring insert 14 is pushed past its operative position.

To function properly, the pouring insert 14 must permit access to the interior 26. To this end, the pouring insert 14 will include a main pour spout 70 extending through the main panel 56. While the main pour spout 70 could take the form of an aperture located fully within the confines of the periphery of the main panel 56 (this arrangement not being shown), this arrangement would space the main pour spout 70 from the interior face of the sidewall 18. During pouring from the container 10, this spacing would prevent a portion of the contents from reaching the main pour spout 70, thus making it difficult to empty the container 10. To avoid this, it is preferred that the main pour spout 70 take the form of a notch in the main panel 56. With this form, the main pour spout 70 will intersect and segment the periphery of the main panel 56, as shown, such that there is a portion of the mounting rim 60 within the extent of the main pour spout 70 which is not contacted by the mounting skirt 58. This form of the main pour spout 70 will not obstruct the contents during pouring.

The main pour spout 70 may take various shapes, whether formed as an aperture or as a notch. In the embodiment shown, the main pour spout 70 takes the form of a section of an oval. Similarly, the main pour spout 70 may be placed at various locations on the main panel 56. It is of course preferred, however, that the main pour spout 70 be located at a position opposite a location intended for manual grasping of the container 10, so that pouring from the main pour spout 70 is facilitated. To this end, the preferred embodiment has the main pour spout 70 located at the smaller diameter of the major axis, such that the user may grasp the smaller diameter of the opposite major axis to hold and tilt the container 10.

When less than all of the contents are poured, and the user is moving the container back to the upright position, there may be a tendency for that portion of the contents adjacent the main pour spout 70 to flow over the main pour spout 70 and onto the upper surface of the main panel 56. To prevent this, the pouring insert 14 may include a pour guide 72. The pour guide 72 will take the form of a surface extending from the edge of the main pour spout 70 toward the interior 26, and tapering toward the center of the main pour spout 70. In the preferred embodiment with the main pour spout 70 intersecting the periphery of the main panel 56, the pour guide 72 may be of a depth equal to that of the mounting skirt 58, and connect thereto. As may be envisioned, the free end of the pour guide 72 will serve to space the contents from the main panel 56 during pouring. Further, should any contents flow onto the pour guide 72 when pouring is completed, the taper of the pour guide 72 will cause this portion of the contents to flow back into the interior 26.

For certain sizes and shapes of container 10, it may be desirable to have more than one pour spout. As such, the pouring insert 14 may include a secondary pour spout 74 located at a position spaced from the main pour spout 70. As before, this secondary pour spout 74 may be an aperture or a notch, may take various shapes, and may include a pour guide 72. While the secondary pour spout 74 may be of the same size as the main pour spout 70, to provide greater versatility it is preferred that it not be of the same size. In the embodiment shown, the secondary pour spout 74 is smaller than the main pour spout 70, and is located opposite the main pour spout 70, for use when the user grasps the smaller diameter end opposite that used for the main pour spout 70.

Although it is often convenient to pour contents from the container 10, for certain contents the user may desire to scoop contents using a spoon or similar utensil. While this could be done through the main pour spout 70 or secondary pour spout 74, providing a pour spout with a sufficient size for use in scooping typically reduces it utility as a pour spout. For certain sizes and shapes, a separate aperture or notch (neither shown) of the desired size could be provided just for this purpose. However, to increase the versatility of the pouring insert 14, it is preferred to provide an arrangement for forming a scooping aperture as desired.

This may be achieved by dividing the main panel 56 into first and second sections 76 and 78, respectively, with these sections being separated by a hinge 80. While the hinge 80 may be formed as a separate element, in the preferred form the entirety of the pouring insert 14 is a monolithic plastic element, with the hinge 80 being a living hinge. The hinge 80 permits the second section 78 to rotate with respect to the first section 76, and in particular between a first position in which the sections 76 and 78 extend in a common plane (shown in FIG. 8) and a second position in which the hinge 80 is folded to cause the sections 76 and 78 to lie adjacent each other (shown in FIG. 11). In this second position the pouring insert 14 has a reduced area, thus forming a scooping aperture defined by the hinge 80 and that portion of the mounting rim 60 extending therebetween.

The hinge 80 could be arranged to permit the second section 78, when in the second position, to lie over the first section 76, to lie under the first section 76, or both. If the second section 78 lies over the first section 76, it could cause an obstruction to the cover 12, would not be aesthetically pleasing, and might tend to collect portions of the contents spilled during scoping. To avoid this, it is preferred to have the second section 78 lie under the first section 76, as shown. This will cause the first section 76 to present an unobstructed surface, best shown in FIG. 11, permitting any contents spilled on the first section 76 to be easily moved back into the interior 26.

Figure 12:
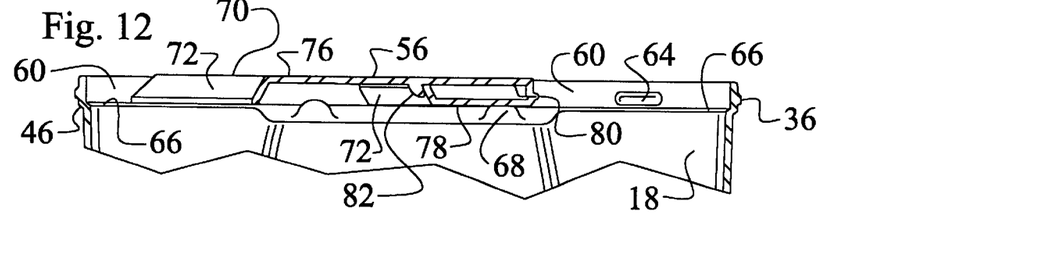
FIG. 12 is a detail cross-sectional side view along line 10—10 of FIG. 8.

Depending upon the type of hinge employed for hinge 80, it may be necessary to secure the second section 78 in the second position. To this end the lower face of the first section 76 may include one or more locking fingers 82, each having a tapered surface positioned to engage over and form an interference fit with the periphery of the second section 78, the secondary pour spout 74 and/or the pour guide 72 of the secondary pour spout 74. In the embodiment shown, a single locking finger 82 is provided to engage over the pour guide 72. The locking fingers 82 and/or the portion of second section 78 to which the locking fingers 82 engage are sufficiently flexible to permit moving into and out of this engagement. As best illustrated in FIG. 12, the locking of the second section 78 in the second position will cause the free edge of the mounting skirt 58 and pour guide 72 of the second section 78 to engage against the lower face of the first section 76, thus preventing the contents from entering this area and being trapped. As shown, a portion of the mounting skirt 58 adjacent each side of the hinge 80 may need to be removed, to prevent interference between these portions in the second position.

In the embodiment shown, the secondary pour spout 74 is located within the second section 78. This permits the user to choose between three different dispensing arrangements with a single pouring insert 14. For other sizes and shapes of containers, however, other arrangements are possible. For example, the secondary pour spout 74 could be located within the first section 76. An application of this might be in a container 10 having a triangular periphery, with the main pour spout 70 located at a first apex, secondary pour spout 74 located at a second apex, and second section 78 located at the third apex. Various other arrangements are of course possible, within limits. Specifically, if the second section 78 is folded under, the outer periphery of the second section 78 must be encompassed by the outer periphery of the first section 76. In other words, no portion of the second section 78 may extend outward beyond the periphery of the first section 76, since the outer periphery of the first section 76 abuts against the mounting rim 60. So long as this does not occur, however, the hinge may be placed as desired.

It is also noted that the user may freely move the second section 78 between the first and second positions so long as there is no obstruction by the container 10. In the embodiment shown, the mounting shoulder 66 forms such an obstruction. As such, if the mounting shoulder 66 is employed, the user must remove the pouring insert 14 from the container 10 before the scooping aperture may be formed or removed.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A storage container with pouring insert, comprising:
    said storage container including a bottom wall having a periphery, and a sidewall extending upward from said periphery to an upper rim, and a mounting rim being defined on an interior surface of said sidewall in proximity to said upper rim;
    said pouring insert including a main panel having a periphery, and a mounting skirt extending downward from said periphery of said main panel, said periphery of said main panel and said mounting skirt being sized and shaped to be closely received within said mounting rim when said pouring insert is in an operative position, said pouring insert including at least one pour spout extending therethrough, and further including a hinge dividing said main panel into first and second sections, said second section being manually moveable about said hinge between a first position in which said second section extends from said first section in a substantially common plane, and a second position in which said second section is substantially parallel to, and below, said first section.

2. A storage container with pouring insert as in claim 1, wherein said at least one pour spout includes a main pour spout in said first section.

3. A storage container with pouring insert as in claim 2, further including at least one locking finger extending from a lower face of said first section and positioned to overlie a peripheral edge of said first section when in said second position, and thus releasably retain said second section in said second position.

4. A storage container with pouring insert as in claim 3, wherein said at least one pour spout further includes a secondary pour spout in said second section.

5. A storage container with pouring insert as in claim 4, wherein said at least one pour spouts each comprise a notch extending into an associated one of said sections.

* * * * *